Patented Aug. 23, 1932

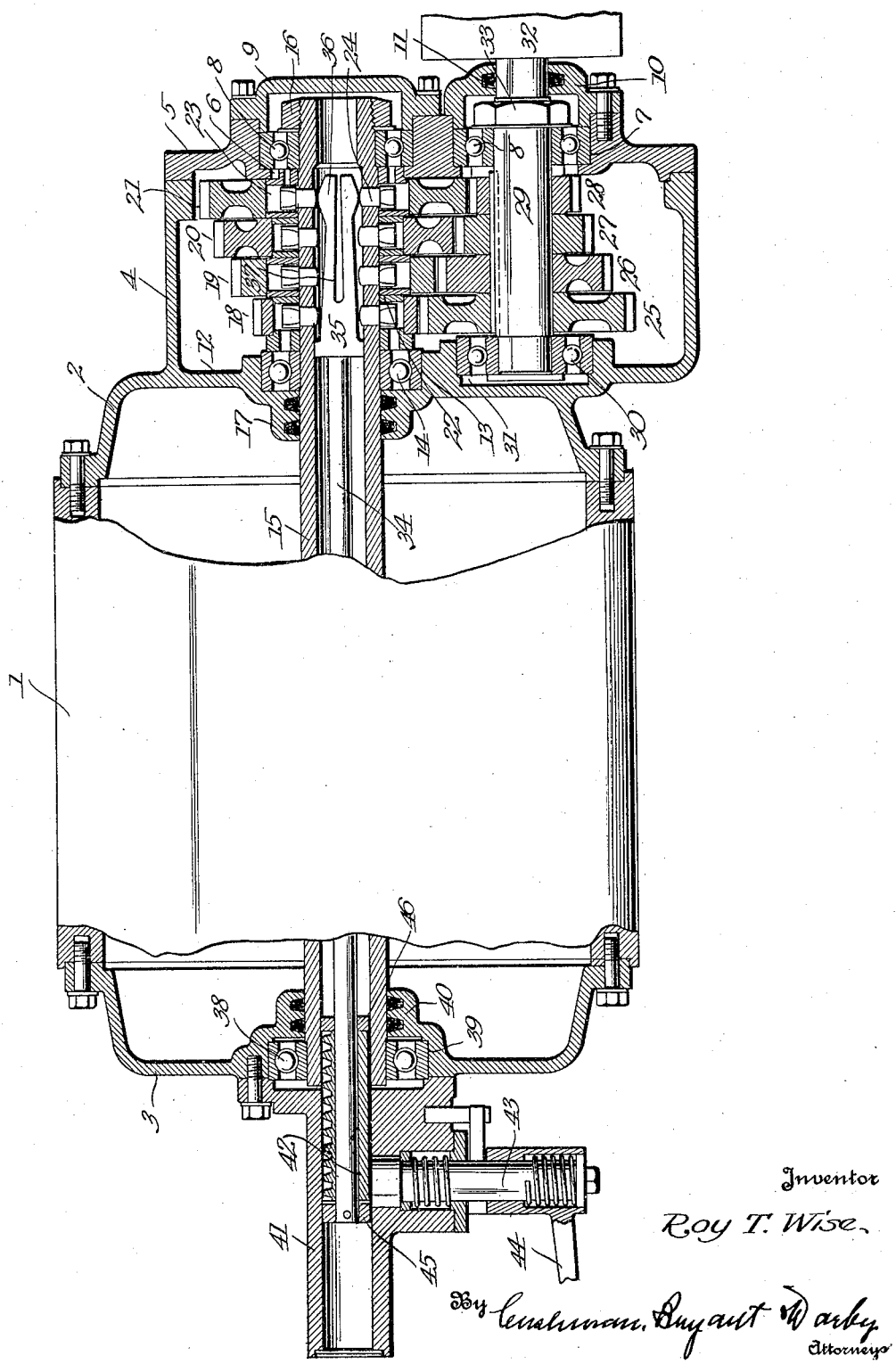

1,872,861

UNITED STATES PATENT OFFICE

ROY T. WISE, OF BERKELEY, CALIFORNIA, ASSIGNOR TO WISE PATENT AND DEVELOPMENT COMPANY, OF NEW YORK, N. Y., A CORPORATION OF DELAWARE

ELECTRIC MOTOR TRANSMISSION

Application filed September 29, 1930. Serial No. 485,212.

This invention relates to new and useful improvements in electric motor transmissions whereby several different speeds can be obtained from a constant speed electric motor.

Heretofore, one or more gears of such transmissions were caused to rotate as soon as the electric motor was turned on, thereby imposing unnecessary wear upon the various parts. In the present invention, the important object is to provide an arrangement wherein none of the gears of the transmission are caused to rotate when the electric motor is first switched on and is accomplished by the provision of a novel armature shaft and association of the clutch mechanism therewith, which permits this armature shaft to rotate free of any gearing when the clutch mechanism is disengaged.

Another object of the invention is to provide a compact transmission mechanism of the above character which can be operated from a point remote and specifically on the opposite side of the motor from that upon which the transmission is associated.

Other objects and advantages of the invention will become apparent during the course of the following description.

In the accompanying drawing forming a part of the description, the figure is a fragmentary longitudinal section through the motor and associated transmission gearing.

Referring now more particularly to the drawing, the numeral 1 indicates a field frame or casing of an electric motor. The opposite open ends of the casing are closed by closure plates 2 and 3. The closure plate 2 forms an integral part of a transmission housing 4 having its outer open end closed by a closure plate 5, bolted thereto as illustrated. This closure plate 5 is provided with a pair of bearing openings 6 and 7 in each of which is disposed an anti-friction bearing 8. The bearing opening 6 at its outer end is housed by a removable cap 9, while the bearing opening 7 is housed with a similar cap 10 having an opening surrounded by a suitable packing 11 for a purpose which will presently appear.

The transmission casing 4 is provided with an integral partition 12 forming a continuation of the closure plate 2. This partition is provided with a bearing opening 13 receiving an anti-friction bearing 14 arranged in axial alignment with the bearing opening 6 for supporting the projecting end of a tubular armature shaft 15. As will be seen, one end of this armature shaft projects through the bearing 14 and through the transmission housing 4 and anti-friction bearing 8 arranged within the opening 6. A thrust nut 16 is screwed onto the outer projecting end of the armature shaft to hold a washer in abutment with the anti-friction bearing 8. Since the gears, to be presently described, and which are mounted within the transmission casing are adapted to run in oil, the partition 12 surrounding the armature shaft is provided with a packing flange 17 to prevent the escape of oil from the transmission into the electric motor.

A series of gears, 18, 19, 20, and 21, of progressively increasing diameters is loosely mounted upon bearing discs 22 which are losely mounted on the projecting end of the armature shaft as explained in my co-pending application Ser. No. 283,248, filed June 6, 1928.

As explained in said application, a friction clutch 23 is provided for each of the gears and comprises essentially a pair of segmental inherently resilient clutch shoes having a running fit in the bore of its respective gear. The adjacent ends of these clutch shoes are beveled, in outwardly converging relationship to an angle of approximately twenty degrees to provide tapered sockets between the shoes at diametrically disposed points. A pair of diametrically disposed clutch elements 24 are slidably mounted in diametrically disposed openings in the tubular armature shaft 15 for each clutch and these elements are provided with enlarged tapered heads fitting the tapered sockets between the clutch shoes so that, upon outward movement of the clutch elements, the clutch shoes are caused to expand radially and circumferentially to frictionally engage the bore of its respective gear for clutching the latter to the armature shaft. As a detailed description of these friction clutches is contained in my aforesaid co-pending application, a further description thereof is deemed unnecessary.

Mounted in constant mesh with the gears 18 to 21 inclusive, is a second series of inversely arranged gears 25, 26, 27, and 28 keyed to a counter shaft 29. The inner end of this shaft is mounted in an anti-friction bearing 30 seated in a socket 31 provided in the partition 12. The other end of this shaft projects through the bearing 8 in the bearing opening 7 through the packing 11 to project a distance beyond the transmission casing 4 to receive a driven element 32 suitably keyed to the projecting end of the shaft. A thrust nut 33 is threaded upon this control shaft to force a washer into abutment with the anti-friction bearing races 8.

Referring further to the clutches, it will be noted that the inner ends of the clutch elements 24 project into the armature shaft 15 to be normally arranged in the path of movement of a clutch actuating mechanism movable longitudinally within the same. This clutch actuating mechanism includes, as in my aforesaid application, a clutch actuating rod 34 having an enlarged portion 35 snugly fitting within the bore of the armature shaft. Beyond this enlarged portion, the rod is tapered off toward its outer end where it is again enlarged to provide a knob or cam 36 adapted for actuation of the clutch elements 24 when moved into engagement therewith. This cam end of the clutch rod is slotted diametrically and longitudinally as at 37 to impart the requisite resilient yieldability thereto in order that the cams 36 will yieldingly move into engagement with the clutch elements 24 and yieldingly move them radially outward to expand any selected clutch shoes and yieldingly retain them in clutch engaging positions.

It will be noted that the armature shaft 15 extends entirely through the motor and the end opposite the transmission is mounted in an anti-friction bearing 38 carried in a bearing opening 39 provided in the closure plate 3. It will also be observed that this closure plate is equipped with a packing flange 40 surrounding the armature shaft. Bolted to the closure plate 3 and covering the opening 39 is a housing 41 for a clutch actuating mechanism including a rack sleeve 42 reciprocably mounted in the housing 41 and slidable into and out of the tubular armature shaft 15. This rack sleeve is moved longitudinally by means of a pinion or worm, not shown, carried by a rotary shaft 43 controlled by an operating handle 44 in the manner disclosed in my aforesaid co-pending application. This rack sleeve 42 is mounted on one end of the clutch actuating rod 34 between a pair of spaced abutments 45 and 46. It will be evident that the clutch actuating rod 34 extends longitudinally through the tubular armature shaft 15 and through the center of the electric motor and, consequently, the clutches 23 at one side of the motor are controlled by the operating mechanism arranged at the remote opposite side thereof.

Normally, the clutch operating rod is disposed so that the cam portions 36 thereof are disengaged from all of the clutch elements of the series of clutches, which permits rotation of the tubular armature shaft independently of any of the gears. However, by moving the clutch operating rod 34 through the armature shaft, any one of the clutches associated with any of the gears 18 to 21 inclusive may be operated to clutch the selected gear to the armature shaft for obtaining the desired speed of the driven shaft 29 through any one of the gears 25 to 28 inclusive. It will be noted that by reason of the specific construction of the actuating rod 34 and its selective engagement with the gears 18, 19, 20 and 21, that the speed of the driven element 32 may be changed or varied when the device is under full load, full speed, and full torque.

It is to be understood that various changes in the construction and arrangement of parts may be made without departing from the scope of the appended claim.

I claim:

In combination with an electric motor, a casing having closure plates removably connected to opposite ends thereof and provided with bearing surfaces, a tubular armature shaft extending through said motor and casing and revolubly mounted in said bearing surfaces, one of said closure plates having an outwardly extending portion forming a transmission housing, a series of gears loosely mounted on the armature shaft positioned within said housing, a friction clutch for each of said gears, a driven shaft mounted in said transmission housing and having a series of gears meshing with said loose gears, a clutch actuating rod extending axially within said tubular shaft and arranged to be operatively connected to each of said clutches for selectively connecting the loose gears to the driven shaft, a cover member extending outwardly from the other of said closure plates and arranged to receive the adjacent end of the actuating rod, and operating means extending laterally from said cover and connected to said actuating rod, whereby the speed of the driven shaft may be changed when operated under full load, full torque and at full speed.

In testimony whereof I have hereunto set my hand.

ROY T. WISE.